Figure 4:
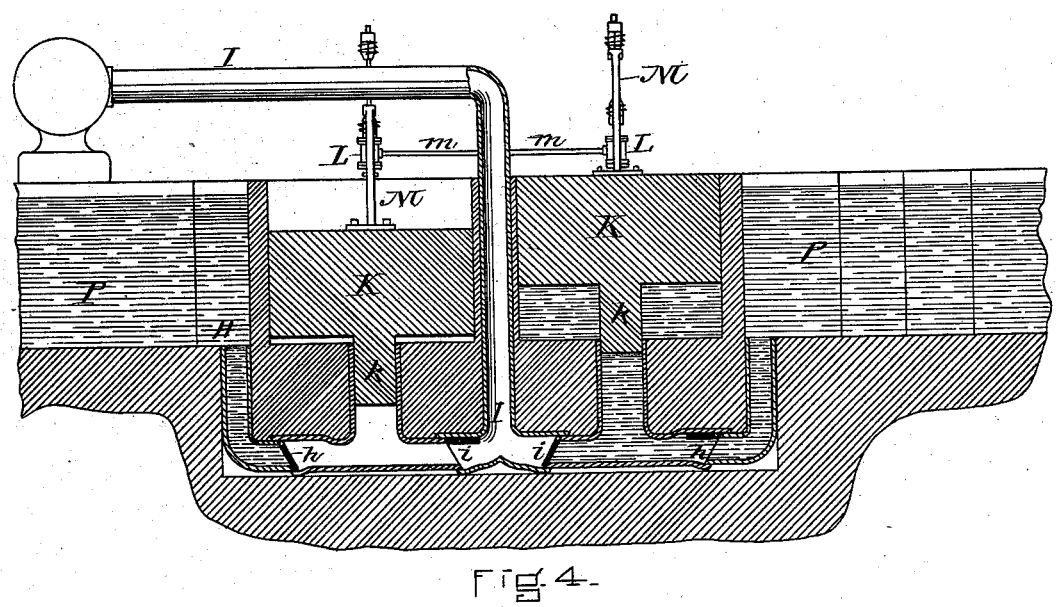

(No Model.) 2 Sheets—Sheet 1.
J. H. HAGERTY.
WATER MOTOR.
No. 400,402. Patented Mar. 26, 1889.
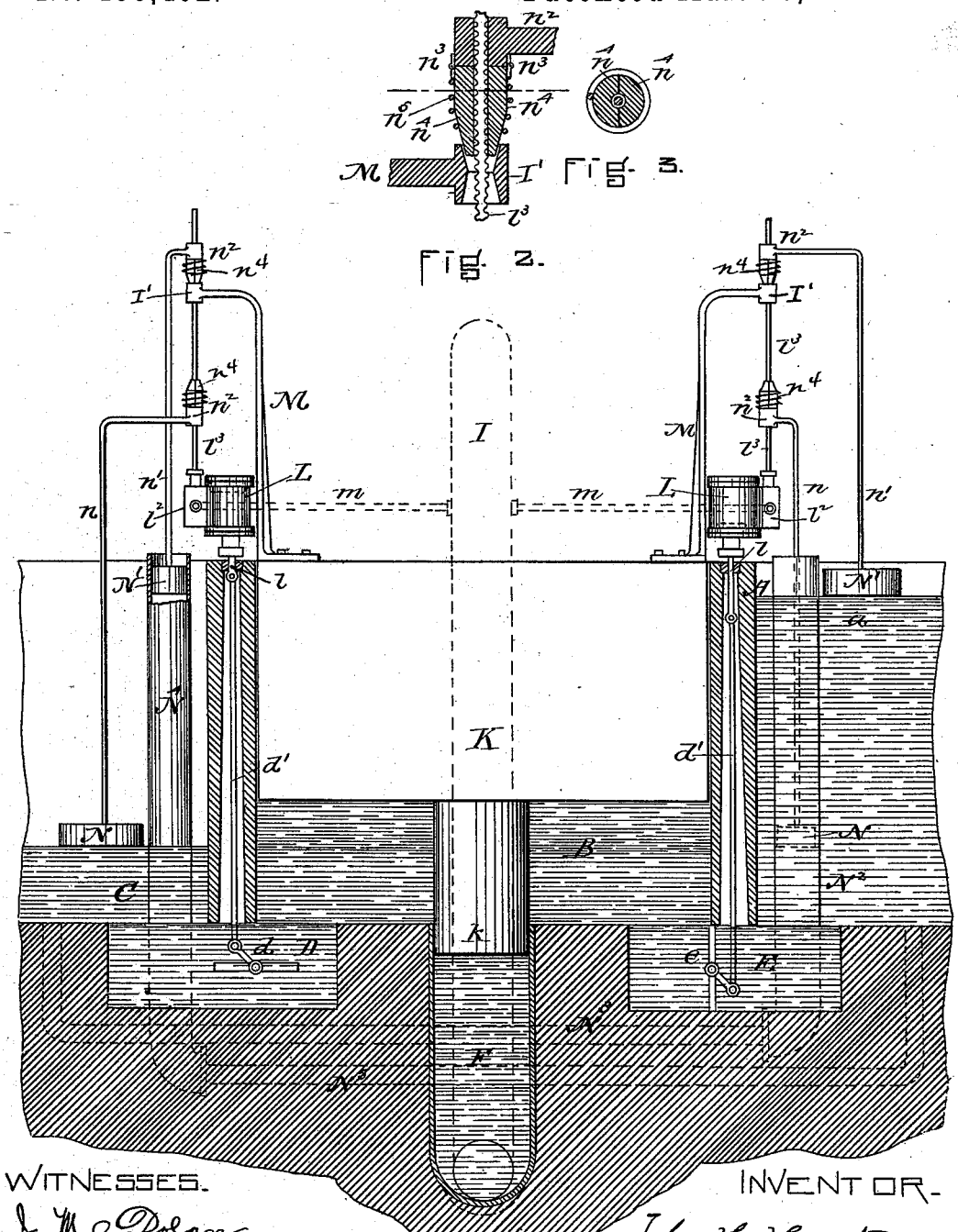
WITNESSES.
INVENTOR.

(No Model.) 2 Sheets—Sheet 2.
J. H. HAGERTY.
WATER MOTOR.

No. 400,402. Patented Mar. 26, 1889.

WITNESSES.
INVENTOR.

UNITED STATES PATENT OFFICE.

JOHN H. HAGERTY, OF LOWELL, MASSACHUSETTS.

WATER-MOTOR.

SPECIFICATION forming part of Letters Patent No. 400,402, dated March 26, 1889.

Application filed January 16, 1888. Serial No. 260,850. (No model.)

*To all whom it may concern:*

Be it known that I, JOHN H. HAGERTY, of Lowell, in the county of Middlesex and State of Massachusetts, a citizen of the United States, have invented a new and useful Improvement in Water-Motors, of which the following is a full, clear, and exact description, reference being had to the accompanying drawings, forming a part of this specification, in explaining its nature.

This invention relates to an improvement in the water - motor patented to me July 6, 1886, No. 344,960, and has special relation to the movement of the valves of such motors and to the arrangement of such motors for continuous work.

In the drawings, Figure 1 represents a vertical section of a water-motor of the construction described in said Letters Patent with the valve improvement added. Fig. 2 is a vertical section of the automatic clutch employed in moving the valves. Fig. 3 is a transverse horizontal section of said clutch. Fig. 4 is a section of the arrangement necessary in employing a pair of motors.

In the drawings of Fig. 1 the wall of the pit in which the plunger works is marked A. The cavity for the float of the water-motor is marked B. The place in which the eduction-water is wasted is marked C. The waste-channel from the water-chamber of the machine to the waste is marked D. The valve controlling this channel D is marked $d$. The induction-passage for water is marked E, and the valve controlling this induction-passage is marked $e$. The plunger-chamber or force-chamber is marked F. The plunger is marked $k$, and the float attached to the plunger is marked K. The exterior head of water is marked $a$, and in Fig. 4 the drafting-main is marked I, and its valve $i$.

Each valve $d$ $e$ has connected with it a valve-stem, $d'$, which is connected to the piston-rod $l$ of a hydraulic engine, L. This hydraulic engine receives its water from the force-main I through a water-pipe, $m$, which enters into the valve-chest $l^2$ of the water-engine L.

The valve-stem $l^3$ of this water-engine L is operated as follows: Upon the top of the float K are placed on each side two goose-necks, M, each of which is made with an eye at the upper end, which surrounds the valve-stem. Each side of this eye is hollow tapered, and the valve-stem is somewhat roughened on its exterior, as shown in Fig. 2. Each one of these water-engines has a contrivance for actuating the valves—a pair of floats, N N'. The float N on the induction side moves up and down in a cylinder or float-cavity, $N^2$, which is connected by pipes $N^3$ with the water on the eduction side of the machine, and consequently this float N on the induction side stands always at the level of water on the eduction side. Upon the eduction side of the machine the float N need not necessarily be in a cylinder or float-chamber. The float N' on the eduction side of the machine is moved up and down in the cylinder or float-chamber $N^4$, which is connected with the water-supply on the induction side of the machine by the pipe $N^5$, and consequently the float N' on the eduction side of the machine will always stand at the same level as the float N' on the induction side of the machine.

The float-stems $n$ $n'$ are attached to the floats N or N', respectively. Each of these float-stems carries upon its end an eye, $n^2$, which surrounds the valve-stem, and to this eye $n^2$ are pivoted or hung in any convenient way, as shown at $n^3$, a pair of clamps, $n^4$, adapted to bite upon the valve-stem. Around these clamps is wrapped the spiral spring $n^5$. The eye in the end of the goose-neck M is tapered, as shown in Fig. 2, and presents a conical cavity toward the tapered end of the clamps $n^4$. It is obvious, therefore, if the float-stems $n$ $n'$ and the goose-neck M are properly proportioned to each other, that the float K, when it has risen nearly to its highest level, will cause the cup I' at the end of the goose-neck M to engage with the tapered end of the clamps $n^4$ and cause them to bite upon the valve-stem $l^3$, and thus shift the valves of the water-engines L upward and cause each of the engines L to make a stroke, and thereby throw their valves $d$ $e$, thus allowing the water to run out of the chamber B, and that when the float K has arrived nearly at the last part of its throw the eye at the end of the goose-neck M will engage the tapered end of the clamps carried by the float-rods $n$ and cause them to bind upon the valve-stem and throw the valves of the water-engine L in an opposite direction, thereby throwing the valves $d$ and $e$ and reversing the action of the engines, and this effect will take place whether the water-levels on the induction side and on the eduction side are near together or far apart, the difference in the action of the machine being simply in the length of the stroke of the float K.

A peculiar arrangement of dams, ponds, and gates is desirable for the best working of this machine. It forms the subject of an application, Serial No. 271,129, which has been subdivided from this, and is not described nor illustrated herein because of an express ruling to that effect.

I claim as my invention and desire to secure by Letters Patent of the United States—

1. The combination, with the float K, of the goose-neck M, adapted to be reciprocated in connection with the float K and provided at its ends with a cupped collar, with the floats N N', their float-rods $n$ $n'$, provided with eyes $n^2$, carrying the clamps $n^4$, and with the valve-stem $l^3$, passing through said clamps, and valves operated thereby, substantially as and for the purpose described.

2. In a water-motor, the combination, with the float K, of an upwardly-extending goose-neck attached to the said float and having a cup, I', a water-engine, its piston-rod, a valve connected with the said piston-rod, a valve-stem, $l^3$, of the said water-engine, a float having an upwardly-extending stem provided with an eye surrounding said stem $l^3$, and clamps $n^4$, hinged to said eye and arranged to be engaged by said cup as the said float K rises or falls, substantially as set forth.

3. The combination, with the water-engine, its valve-stem $l^3$, and a valve operated by said water-engine, of a float having an upwardly-extending stem provided with an eye surrounding said valve-stem, the clamps hinged to said eye, and a float having a goose-neck provided with a cup to engage said clamps, substantially as set forth.

4. The combination, with the float K, a water-engine, L, and the piston-rod of the latter, of the engine valve-stem $l^3$, the clutches $n^4$, the floats N N', by which said clutches are supported, a goose-neck, M, having a cup to operate said clutches, and a valve connected with the said piston-rod, substantially as set forth.

JOHN H. HAGERTY.

Witnesses:
F. F. RAYMOND, 2d,
J. M. DOLAN.